United States Patent Office 2,936,726
Patented May 17, 1960

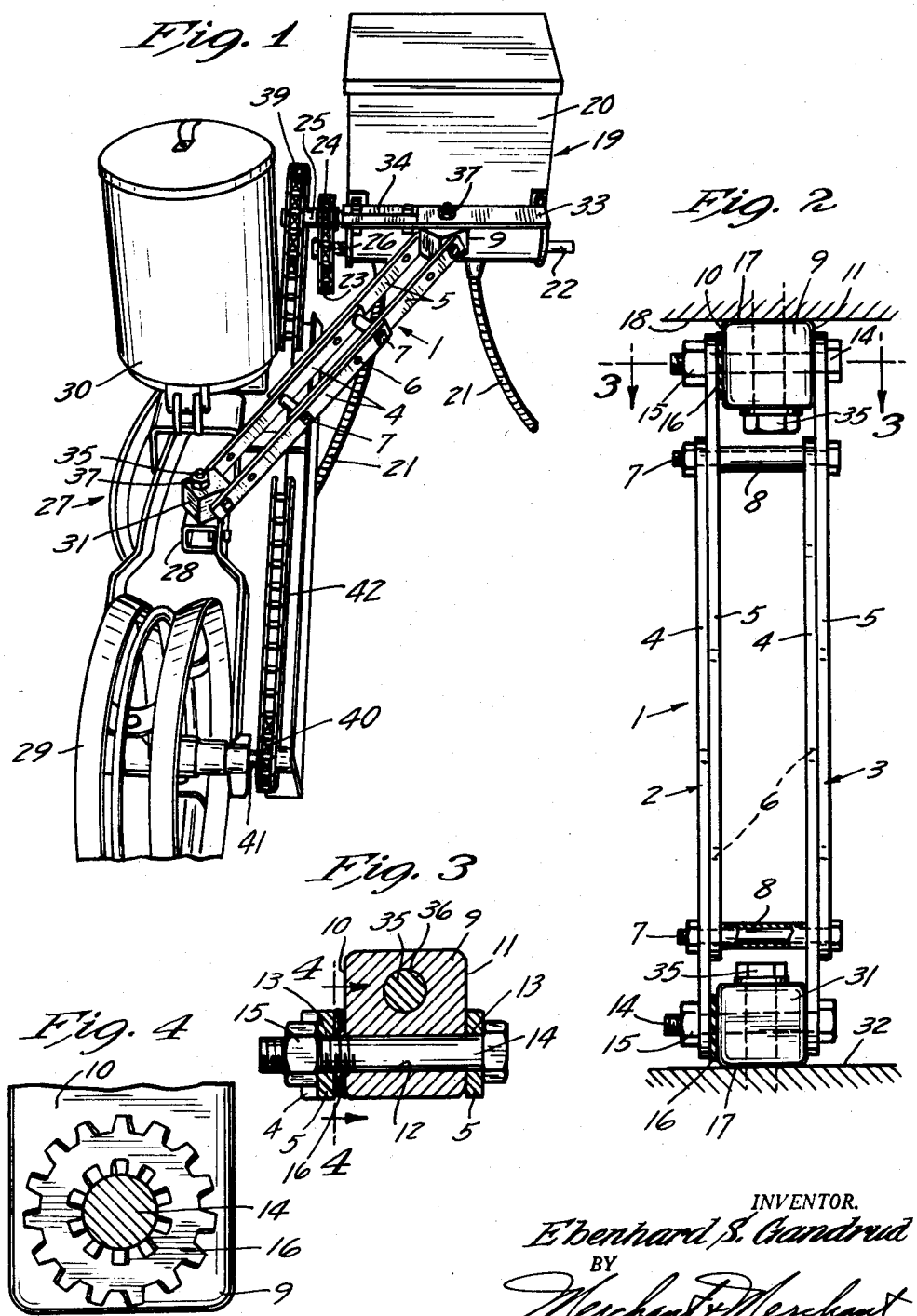

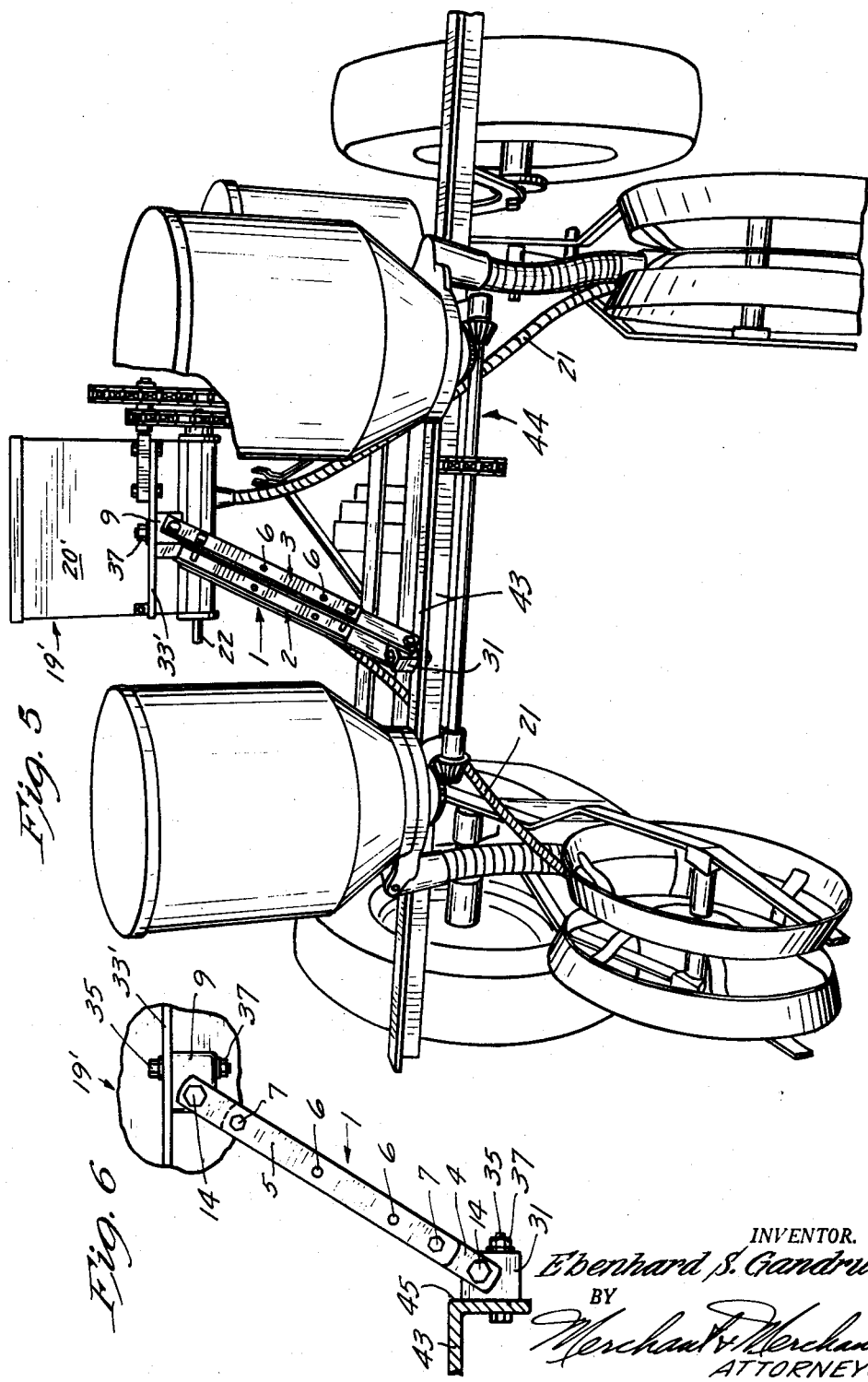

2,936,726

STRUCTURE FOR MOUNTING AUXILIARY APPARATUS ON AGRICULTURAL IMPLEMENTS

Ebenhard S. Gandrud, Owatonna, Minn.

Application April 24, 1956, Serial No. 580,402

4 Claims. (Cl. 111—80)

My present invention relates generally to improvements in agricultural equipment and, more particularly, to means for mounting auxiliary power driven apparatus on agricultural implements whereby said apparatus is positioned to be driven by a suitable operating portion of said implement.

More specifically, my present invention relates to a generally universal mounting device whereby auxiliary apparatus such as a dispensing device or applicator for powdered or granular insecticide or the like may be mounted on row crop planters, listers and like implements.

Due to the fact that the sceveral manufacturers of agricultural equipment produce implements for performing like functions, but which vary to a marked degree in design and construction, mounting of auxiliary apparatus on implements, such as row crop planters and the like, has heretofore necessitated the use of a special mounting device for each different make or size of implement. The problem of mounting such auxiliary apparatus is more acute when it is desired to couple said apparatus to a rotating or otherwise moving part of the implement, to be driven thereby. The primary object of my invention, is, therefore, the provision of a mounting device for auxiliary apparatus whereby said apparatus may be quickly and easily mounted on any of the present-day equipment for the purpose above mentioned, and locked in position for efficient operation.

Another object of my invention is the provision of a mounting device for the purpose set forth having a longitudinally extensible and retractable supporting arm whereby said auxiliary apparatus may be raised or lowered with respect to the implement on which said apparatus is mounted.

Still another object of my invention is the provision of a mounting device of the type herein disclosed which will enable said auxiliary apparatus to be supported from either a generally horizontal or a generally vertical surface portion of the implement, and which may be rigidly secured to either a horizontal or vertical surface portion of the apparatus to be supported.

Another object of my invention is the provision of a mounting device as set forth which is simple and inexpensive to produce and install, and which is rugged in construction and durable in use.

The above, and still further highly important objects and advantages of my invention will become apparent from the following detailed specification, appended claims and attached drawings.

Referring to the drawings, which illustrate the invention, and in which like characters indicate like parts throughout the several views:

Fig. 1 is a fragmentary view in perspective of a conventional row crop planter, illustrating the use of my invention in the supporting of an auxiliary apparatus thereon;

Fig. 2 is a view in side elevation of my novel device;

Fig. 3 is an enlarged horizontal section taken substantially on the line 3—3 of Fig. 2;

Fig. 4 is a still further enlarged fragmentary view partly in elevation and partly in section, taken substantially on the line 4—4 of Fig. 3;

Fig. 5 is a fragmentary view in perspective of a row crop planter differing from the planter of Fig. 1, and illustrating the use of my device in supporting an auxiliary apparatus thereon; and Fig. 6 is a fragmentary view in side elevation showing a still different arrangement of the parts of my device.

In the preferred embodiment of my invention illustrated, the numeral 1 indicates in its entirety a supporting beam comprising a pair of laterally spaced parallel arms 2 and 3, each of which includes cooperating arm sections 4 and 5. Each of the arm sections 4 and 5 are provided with a plurality of longitudinally spaced transverse openings 6 which are adapted to selectively receive nut-equipped tie bolts 7. The arms 2 and 3, intermediate their ends, are maintained in spaced parallel relationship by tubular spacers 8 mounted on the tie bolt 7 between the arms 2 and 3. The several openings 6 through the arm sections 4 and 5 permit the arms 2 and 3 to be adjusted in length from that illustrated in Figs. 2, 5 and 6, to and beyond that illustrated in Fig. 1.

Disposed between the upper ends of the arm sections 5 is a head element 9 having opposed parallel side surfaces 10 and 11 which face the inner surfaces of the arm sections 5 at their upper end portions. The head member 9, which is of generally rectangular block-like shape, is provided with a transverse aperture 12 that is aligned with transverse openings 13 at the upper ends of the arm sections 5. A clamping screw 14 extends through the aligned openings 12 and 13 and is provided with a clamping nut 15, for the purpose of rigidly locking the head member 9 against rotary movements with respect to the arms 2 and 3 about the axis of the clamping screw 14. For the purpose of further insuring against such rotary movement of the head member 9, I provide a lock washer 16 that is interposed between the side surface 10 of the head member 9 and the inner surface of the adjacent arm section 5.

The head member 9 is provided with a flat surface portion 17 that is adapted to engage a cooperating flat surface portion 18 on the apparatus to be supported. For the purpose of the present example, the above-mentioned apparatus is in the nature of a dispenser 19 for granular or powdered materials such as insecticide, fertilizers and the like. The dispenser or applicator 19, in itself, does not comprise the instant invention. Hence, detailed showing and description thereof is not deemed necessary, and for the sake of brevity, is omitted. It will be noted, however, that the dispenser or applicator 19 is shown as comprising a hopper 20, feeding tubes 21 and an agitator shaft 22 having mounted on one end thereof a sprocket wheel 23 that is coupled to a cooperating sprocket wheel 24 mounted on a jack shaft 25, and by means of an endless link chain 26. It may be assumed that the feeding tubes 21 extend downwardly to suitable locations with respect to the machine on which the dispenser 19 is mounted, whereby to deliver material to a point adjacent seeds which are planted by said machine or implement. In Fig. 1, the implement is indicated in its entirety by the numeral 27 and includes a frame member 28, ground-engaging wheels 29, one of which is shown, and a dispensing hopper 30 containing seed to be planted by the usual mechanism, not shown.

A generally rectangular block-like base member 31 identical to the head member 9 is mounted between the lower ends of the arm sections 4 in the same manner as the head member 9 and for pivotal movements with respect to the arms 2 and 3 on a transverse axis parallel to the axis of pivotal movement of the head member 9, Inasmuch as the base member 31 is identical to the head member 9, like reference characters are applied to like portions of the base member 31, including a clamping screw and cooperating clamping nut 14 and 15 respectively therefor. Like the head member 9, the base member 31 defines a flat surface portion 17 that is generally parallel to the axis of its respective clamping screw 14, and which engages a cooperating flat surface portion 32 of the frame 28 of the planting device 27.

With reference to Figs. 1 and 2 it will be seen that the surface portion 18 defines the bottom surface of a mounting bracket or the like 33 on the dispenser or applicator 19, the jack shaft 25 being carried by a mounting block 34 secured to one end portion of the bracket 33. A pair of anchoring bolts 35 extend one each through an aperture 36 in a different one of the members 9 and 31, and are received in suitable cooperating apertures in the bracket 33 and frame 28 respectively. It will be noted that the anchoring bolts 35 extend through the surfaces 17 of the members 9 and 31 in directions normal to the axes of their respective clamping screws 14 and laterally offset therefrom. The anchoring bolts 35 are provided with cooperating nuts 37 by means of which the members 9 and 31 are locked against pivotal movement with respect to the frame 28 and bracket 33. Adjustment of the length of the arms 2 and 3, together with pivotal movement of the head and base members 9 and 31 with respect to the arms 2 and 3 and the dispensing device 19 and frame 28, will position the dispenser 19 in a manner to be suitably driven from the wheel 29 of the implement 27. When the apparatus 19 is so positioned, as indicated in Fig. 1, and the clamping screws 14 and anchoring bolts 35 tightened, a pair of sprocket wheels 39 and 40 may be placed respectively on the jack shaft 25 and the shaft 41 of the implement wheel 29, and an endless chain 42 mounted to run over the sprocket wheels 39 and 40 to drive the agitator shaft 22 of the dispenser or applicator 19. By adjustment of the length of the arms 2 and 3, the dispenser 19 may be supported at a sufficient height to permit the material dispensed thereby to gravitate uniformly to the lower ends of the delivery tubes 21 and be distributed with a high degree of accuracy. The arm sections 4 and 5, being made from relatively heavy steel bar stock, are quite strong and support the dispenser 19 with great rigidity. The lock washers 16 between the side surfaces 10 of the members 9 and 31 and their cooperating arm sections 5 and 4 respectively effectively lock the members 9 and 31 against rotation relative to the arms 2 and 3.

In the arrangement illustrated in Fig. 5, the base member 31 is shown as being mounted on a cross frame member 43 of a planter 44 of slightly different design than that illustrated in Fig. 1. The head member 9 is shown as being bolted to a bracket 33' of a dispenser 19' identical to that illustrated in Fig. 1 and above described. While the mounting block 31 is shown as being secured to the top surface of the frame member 43, it is obvious that the base member 31 may be as readily secured to a side surface thereof. Such an arrangement is illustrated in Fig. 6, the base member 31 being shown as being mounted on the front flat surface 45 of the angle iron frame member 43. It should be obvious that the head member 9 may also be as readily secured to a generally vertical surface as well as a horizontal surface as shown.

My novel mounting device has been utilized in connection with a number of agricultural implements of various makes of manufacture and has been found to be completely satisfactory for the mounting of apparatus thereon; and while I have shown and described a preferred embodiment of my novel mounting device, it should be understood that the same is capable of modification without departure from the spirit and scope of the invention as defined in the claims.

What I claim is:

1. For use in combination with any one of a plurality of mobile agricultural machines having different frames and differently located rotary power means for operating planting devices thereon, an auxiliary hopper device for delivery of granular material to points adjacent which seeds are delivered by the planting device of any one of said machines, said hopper device having a rotary member to be driven by the said rotary power means and having bracket means for adjustably securing it to the frame of any one of said mobile machines, said bracket means comprising an elongated rigid arm and universal connecting means joining one end of said arm to the frame of the machine and the other end of said arm to said auxiliary hopper device, and means for locking said universal connecting means in different adjusted positions, whereby to securely mount said auxiliary hopper device on the frame of said any one of such agricultural machines in operative relationship with respect to the planting device thereon and with its rotary member arranged for operative driving connection to the rotary power means of the machine.

2. The device according to claim 1 in which the elongated rigid arm is formed of two rigid sections longitudinally adjustable with respect to each other and including means for releasably locking them in adjusted position.

3. The device according to claim 1 in which the elongated rigid arm comprises a pair of laterally spaced parallel bars, the universal connecting means comprising mounting block-like base and head members each having an opening extending transversely therethrough and axially aligned with cooperating transverse apertures in the adjacent end portions of said bars, nut-equipped clamping screws extending through said transverse openings and said cooperating apertures, each of said members having a generally flat surface portion generally parallel to the cooperating flat surface portion on said auxiliary hopper device and on the frame of the machine, said head and base members having apertures extending therethrough normal to the generally flat surface portions thereof and to the axes of said clamping screws and laterally offset from said clamping screws, and a pair of anchoring bolts extending laterally outwardly from said surface portions of the base and head members, said anchoring bolts being adapted to be received in cooperating apertures in said hopper device and the frame of the machine.

4. The device according to claim 3 in which the bars each comprise a pair of juxtaposed longitudinally adjustable bar sections and means for securing said bar sections in adjusted position.

References Cited in the file of this patent

UNITED STATES PATENTS

| | | |
|---|---|---|
| 641,748 | Smith | Jan. 23, 1900 |
| 1,037,724 | Bradford | Sept. 3, 1912 |
| 1,328,677 | Hodny | Jan. 20, 1920 |
| 1,535,419 | Jarfas | Apr. 28, 1925 |
| 1,736,936 | Padavic | Nov. 26, 1929 |
| 1,751,346 | Mazak | Mar. 18, 1930 |
| 1,876,485 | Bormann | Sept. 6, 1932 |
| 2,164,066 | Holle | June 27, 1939 |
| 2,766,708 | Hooks | Oct. 16, 1956 |

FOREIGN PATENTS

| | | |
|---|---|---|
| 468,600 | Canada | Oct. 10, 1950 |